Sept. 11, 1962 O. K. KELLEY 3,053,051
TRANSMISSION
Filed May 28, 1958 2 Sheets-Sheet 2
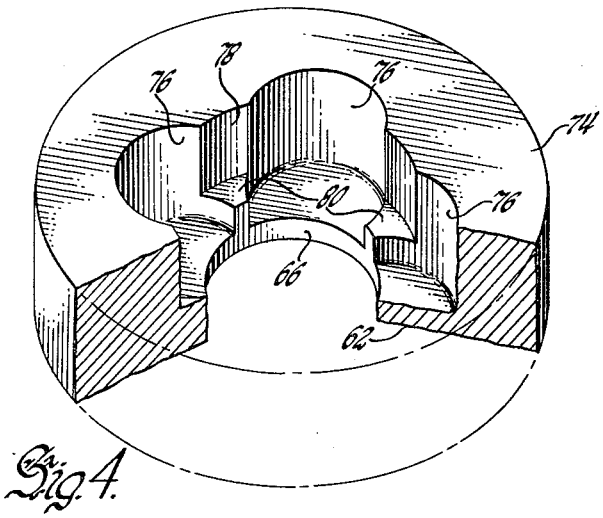
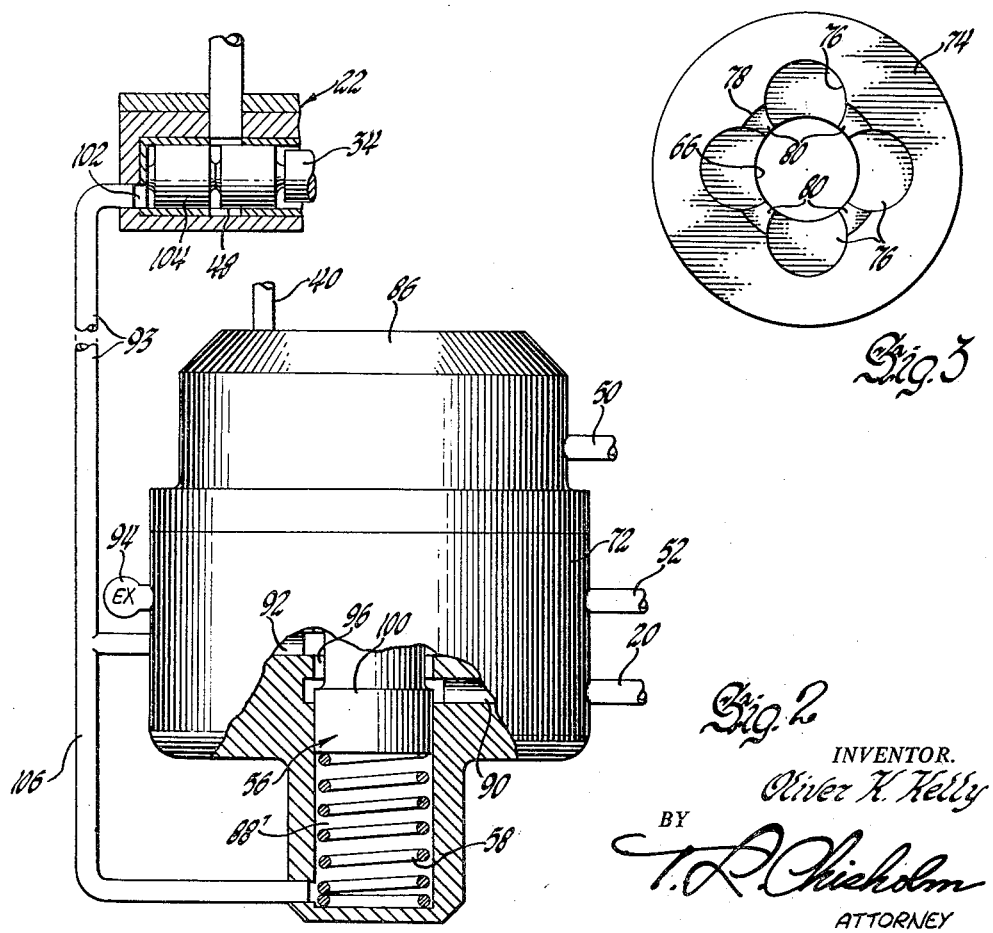
INVENTOR.
Oliver K. Kelly
BY
T. R. Chisholm
ATTORNEY United States Patent Office 3,053,051
Patented Sept. 11, 1962

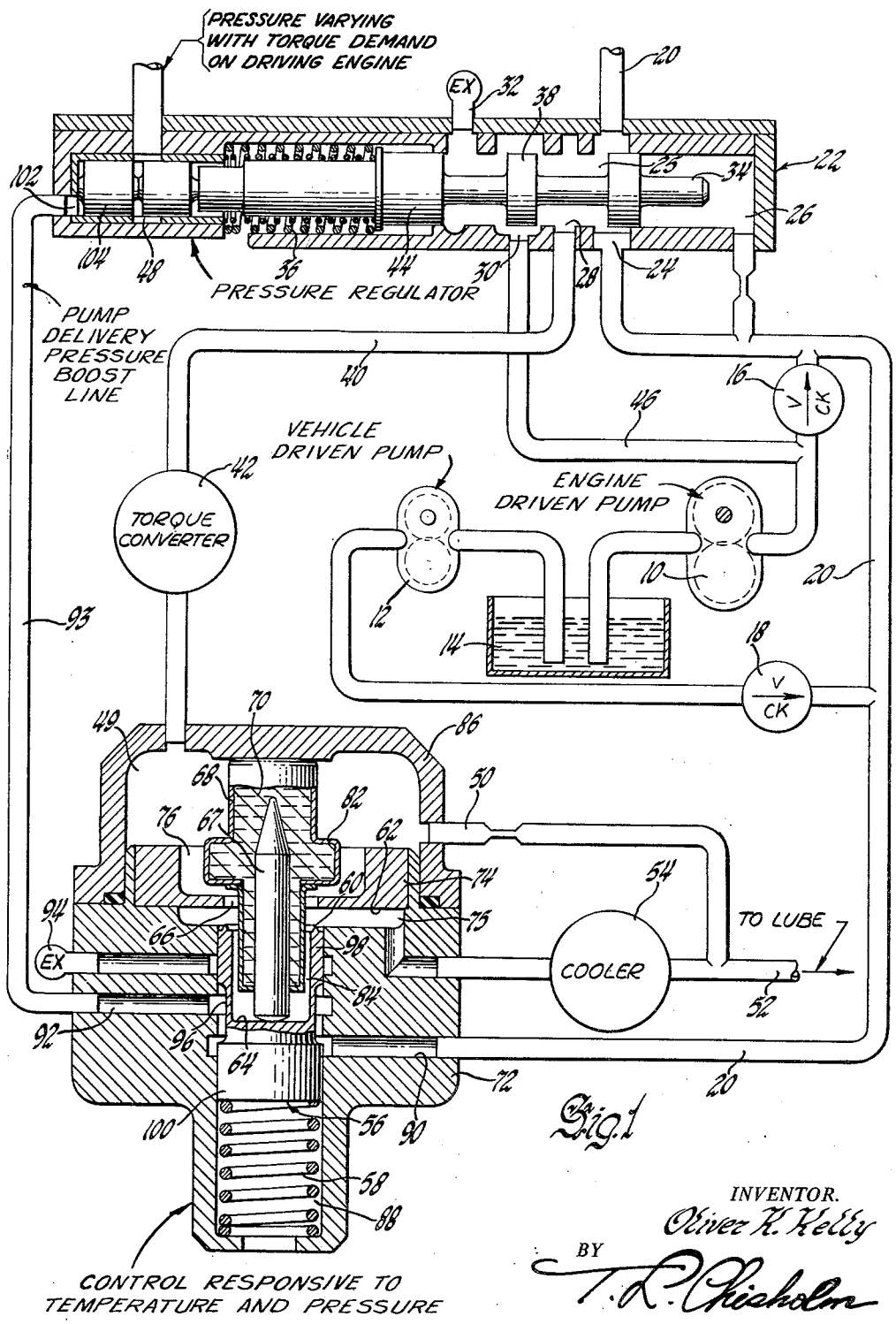

3,053,051
TRANSMISSION
Oliver K. Kelley, Bloomfield Hills, Mich., assignor to General Motors Corporation, Detroit, Mich., a corporation of Delaware
Filed May 28, 1958, Ser. No. 738,498
22 Claims. (Cl. 60—54)

This invention relates to control systems for that type of transmission which includes a hydrodynamic torque transmitter such as a torque converter or a fluid coupling which transmits torque from a prime mover to a load, for example for driving a motor vehicle from the usual engine.

Such transmissions have a hydrodynamic torque converter or fluid coupling driven by an engine and which drives the propeller shaft of an automobile. The torque converter may be connected to the propeller shaft through gearing and various torque-establishing devices such as brakes and clutches which determine the speed ratios and direction of rotation of the propeller shaft. It is customary to provide an oil pump driven by the engine and a second oil pump driven by the propeller shaft either or both of which supply oil under pressure for operating the torque-establishing devices and the torque converter. The torque converter is kept filled with oil under a static pressure which is usually less than the pressure required to operate the torque-establishing devices and the oil is continuously circulated through the converter. Since the operation of the torque converter inherently generates heat, it is customary to provide a cooler through which the oil is circulated by the pumps, and means is provided for directing more or less oil through the cooler as conditions may require.

One of the problems encountered in the operations of transmissions of this character is that the oil is overheated under some conditions of heavy load. This may occur in spite of an adequate cooler, and may result from not pumping oil through the cooler fast enough to cool it adequately. If the converter is charged at sufficient pressure to operate satisfactorily (including prevention of cavitation) either a large pump must be used, or else the circulation of liquid must be restricted. Both of these are undesirable. Restriction of circulation prevents cooling and a large pump at high pressure requires too much power to drive it at times when little cooling is required. When a pump of reasonable pressure and capacity is used there are times when the cooling is inadequate even when the usual flow controlling devices are set to provide maximum flow through the cooler.

To eliminate this difficulty, it is one of the objects of the invention to provide a system having small pumps which are economical to operate in normally providing adequate pressure for the control system, and to provide for increased flow through the cooler under conditions of heavy load by increasing the delivery pressure of the pumps which circulate the oil. It is desirable to increase the delivery pressure only when such increased circulation is required and not to have the pumps operating constantly at a high pressure because this causes power losses in the system.

Other objects and advantages of the invention will be apparent from the following description and from the accompanying drawings, in which FIG. 1 is a diagram of a portion of a control system for a transmission embodying one form of my invention, FIG. 2 is a fragmentary diagram showing a modified form, FIG. 3 is a structural plan of a supporting member for a thermostatic element used in both FIG. 1 and FIG. 2 and, FIG. 4 is a perspective of a cut-away portion of the member illustrated in FIG. 3, showing supporting shoulders and flow passages.

As example of a transmission and control system therefor to which my invention is applicable is more fully disclosed in the application filed by me and Winchell Dec. 22, 1955, S.N. 554,881, Patent No. 3,010,278, of Nov. 28, 1961, the disclosure of which is incorporated herein by reference.

Referring to FIG. 1 the control system to which my invention is applied includes a front pump 10 driven by the engine and a rear pump 12 driven by the output shaft. These pumps take in oil from a sump or reservoir 14 and deliver it at high pressure through check valves 16 and 18, respectively, to a main control line 20. The pressure in the pumps and main line is regulated by any suitable pressure regulator valve generally denoted by 22, and having a main line inlet port 24, a regulated pressure chamber 25, a pressure regulating chamber 26 connected to the main line, a converter feed port 28, a front pump selector port 30 and an exhaust port 32 connected to the sump 14. The main line 20 leads from the regulator valve to deliver fluid at regulated pressure to the various torque-establishing devices as more fully disclosed in application S.N. 554,881, referred to. The ports in the regulator valve are controlled by valve stem generally denoted by 34 constantly urged to the right as FIG. 1 is seen by a spring 36. When neither pump is providing pressure in the chamber 26 the spring holds the valve stem fully to the right so that a land 38 closes the converter feed port 28 and load 44 closes exhaust port 32. Whenever either pump provides high enough pressure to operate the torque-establishing devices, pressure in the regulating chamber 26 moves the stem 34 to the left until the land 38 uncovers port 28 to supply oil through the conduit 40 to the converter 42. It will be appreciated that the position of the stem 34 is a measure of the pressure in the chamber 26 and in the main line 20. Therefore, when the converter feed port 28 is open the system is being supplied at a predetermined minimum pressure by either or both of the pumps. The particular structure of the regulator valve, as so far described, is well known, and is not part of this invention.

When the engine is operating at or above idling speed and the car is not moving, the front pump 10, which is of larger capacity than the rear pump, supplies the entire requirements of the control system. The presure is regulated at a substantially constant value by the land 44 which operates as a relief valve and cracks the port 32 to relieve excess pressure from conduit 46 to the sump. The land 38 prevents communication between the regulated pressure chamber 25 and the vent port 32 except through conduit 46 when the engine is operating and the car is not moving.

When the car begins to move, the rear pump begins to supply oil to the system, and as long as the car is moving below a predetermined speed, for example 35 m.p.h., both pumps can supply oil. Whenever the car drives the rear pump fast enough to supply all the oil that the system requires, the pressure of both pumps in chamber 26 moves the valve stem 34 so far to the left that the land 44 opens the exhaust port 32 which unloads the front pump and land 38 cracks the port 30 to relieve excess presure in the chamber 25 through ports 30 and 32. This reduces the pressure of the front pump to zero by connecting line 46 directly to the vent 32, and regulates the pressure of the line at a constant value somewhat higher than the pressure maintained by the front pump when operating alone. Therefore, the pressure regulator valve 22, as so far described, tends to maintain a substantially constant pressure in the system as determined by the spring 36. The particular structure and operation of the regulating valve, as so far described, are well known, and form no part of this invention.

However, this pressure maintained by the spring 36 can be increased with increasing torque demand on the engine by a pressure-boosting chamber 48 which is connected to a source of pressure which is a measure of the torque demand on the engine, as more fully described in S.N. 554,881, Patent No. 3,010,278, of Nov. 28, 1961. Whenever the torque or power demand on the engine is high, as indicated by opening the throttle wide or by high pressure in the induction manifold of the engine the pressure in chamber 48 is increased so that the force tending to close vented port 30 is increased and this provides higher pressure in the main line 20 than is effected by the spring 36 alone. This higher pressure varies with the torque demand on the engine. Thus the chamber 48 constitutes means for maintaining a range of pressure which increases with torque demand.

The static pressure in the hydrodynamic torque transmitter, whether torque converter or fluid coupling, is normally maintained at a value below main line pressure by controlling the flow from the transmitter. Oil can flow from the transmitter at all times through a temperature measuring chamber 49 and thru a restricted or slow-flow conduit 50 to the lubrication lines 52. Oil can also flow from the converter to the lubrication lines through a cooler 54 under the control of a valve member 56 which is both a pressure relief valve and a pressure regulating valve responsive to the temperature of the oil flowing from the converter. The control member 56 is urged upwardly by a spring 58 normally to close a relief valve 60 (formed by the edge of member 56) against a seat 62 to prevent flow from the torque converter through the cooler. The hollow interior of the control member 56 has a pressure area 64 constantly exposed to the pressure in the torque converter through the passage 66 so that whenever the pressure in the torque converter exceeds a predetermined amount the relief valve 60 is opened against the force of the spring 58 to permit flow directly to the lubrication line 52 around the restricted orifice 50 and through the cooler 54. This relief valve graduates or regulates the outflow from the converter to maintain a substantially constant pressure in the torque converter and does this without fully opening the valve 60. Whenever the valve 60—62 is partially open it establishes communication between the pressure area 64 and the cooler. Consequently, if resistance to flow through the cooler increases (for example due to clogging or to cold viscous oil) the resulting increase of pressure at the cooler is reflected in an increase of pressure on the area 64. Thus once the valve 60—62 is partially opened any increase in pressure at the cooler opens this valve farther. This further increases the rate of flow through the cooler. It also will increase the main line pressure to increase the rate of flow through the cooler, as will be explained.

Most of the flow through the torque converter is normally through the cooler and this tends to keep the oil in the system below a predetermined maximum temperature. The flow through the cooler can be increased by fully opening the valve 60 and this can be done in response either to resistance to flow in the cooler or to an increased temperature of the oil in the converter by a temperature-responsive valve operator having a piston 67 protruding from a container filled with a material 70 which expands as its temperature increases. The container 68 is held in a fixed position in the chamber 49 to sense the temperature of oil leaving the converter.

Preferably the structure of the temperature and pressure-responsive control mechanism is as shown in FIG. 1. A housing 72 has fixed to its upper face a valve seat plate 74 which is formed as shown in FIGS. 3 and 4. The seat plate is in the form of a disc pierced by the opening 66 which forms the passage previously referred to between the chamber 49 and an annular space 75 connected to the cooler. The valve seat 62 is the portion of the lower face of the disc 74 surrounding the passage 66. Disposed about the passage 66, and parallel with its axis, and within the body of the disc 74 are a number of blind bores 76 which extend only part way through the disc and intersect the passage 66 so that liquid can flow at all times from the chamber 49 through the bores 76 and central passage 66 to the interior of the control member 56 to exert pressure on the face 64. Also, whenever the valve 60 is open or unseated liquid can flow from the chamber 49 through the bores 76 and passages 66 and 75 to the cooler. A third bore 78 is made in the seat plate which is concentric with the passage 66 and extends into the plate to a depth less than the depth of the bores 76 so that four shoulders 80 are formed about the end of the bore 78 and above the bottoms of the bores 76. The temperature-responsive container 68 is formed with a shoulder or ring 82 which rests on the shoulders 80 to support the container in the housing 72. The shoulders 80 do not show in FIG. 1 because they are behind the container 68. The ring portion 82 of the container 68 sets in the bore 78 to hold the container 68 concentric within the hollow interior of the control member 56 so as the leave a passage 84 between the container and the member 56 which always communicates pressure from the chamber 49 to the pressure area 64 within the control member 56. The container is held axially or vertically in precise position within the housing 72 by a cover 86 which clamps the container 68 against the shoulders 80. This is for the purpose of precisely positioning the piston 66 with reference to the control member 56 at any given temperature.

The control member 56 is slidable in an open bore 88 in the housing 72 which bore has a main line inlet port 90, a pressure-regulating port 92 and a vent port 94. The exterior surface of the control member 56 is formed with a groove 96 between two lands 98 and 100 so that the member 56 forms a pressure-regulating valve, as will now be explained.

Whenever the control member 56 is in the position shown in FIG. 1 the land 98 closes exhaust port 94 and the land 100 opens main line inlet port 90 so that groove 96 conducts oil at main line pressure to the pressure-regulating port 92 which is connected through conduit 93 to an expansible pressure boost chamber 102 one end of which is formed by piston 104 in the main regulator valve 22. This adds a definite force to those forces in the regulator valve (the spring 36 and the pressure in chamber 48, if any) which increases the pressure of the main line. Therefore, when the valve 56 is in the position shown in FIG. 1 the pressure regulator valve 22 maintains in the line 20 a fixed pressure higher than the pressure maintained by the spring 36. When there is pressure in the throttle modulating chamber 48 or when there is pressure in the chamber 102 the valve 22 maintains a higher range of pressure in the main line than when there is no pressure in these chambers. Higher line pressure increases the rate of flow through the torque converter and through the cooler.

When the control member 56 is moved up as FIG. 1 is seen the land 100 can close the main line inlet port 90 and the land 98 can open the exhaust port 94 so that the groove 96 releases all pressure in the pressure boost chamber 102, through exhaust port 94. The valve 56 can reach this position without closing the valve 60 upon its seat 62.

When the oil is cool the thermostatic material 70 contracts to permit the spring 58 to push the piston 67 into the container 58 and move the control valve 56 up. When there is no flow and the oil is cool the spring can close the valve 60 against the seat 62. When oil begins to flow the pressure area 64 moves the valve 56 down against the spring to open the flow valve 60 to maintain the desired pressure in the torque converter. If the temperature of the oil increases beyond a first predetermined value, expansion of the thermostatic material expresses the piston 67 to open the valve 60 farther to permit increased flow through the cooler. This tends to keep the oil at or below predetermined maximum temperature. However, if the temperature of the oil increases beyond this first predetermined maximum the temperature-responsive material 70 expresses the piston still further to the position shown in FIG. 1 to increase the pressure of the main line, as described above. The increase of pressure of the main line increases the rate of flow through the cooler. Increased flow tends to cool the oil, which tends to contract the material 70 or prevent its further expansion. Thus, the device tends to prevent increase of pressure of the oil beyond a second predetermined maximum.

In the form of the invention shown in FIG. 2 everything is as shown in FIG. 1 except that the bore 88' is closed at its end and the port 92 is connected to the interior of the bore below the control member 56 by a conduit 106. This causes the valve member 56 to deliver a pressure to the boost chamber 102 which varies with the temperature of the material 70 and hence varies with the temperature of the oil flowing from the converter. If the temperature increases past the point at which the land 98 just closes the vent port 94 and the land 100 just cracks the main line entry port 90 pressure from the port 92 in the bore 88' below the piston formed by the control member 56 tends to close the inlet port 90 and open the vent port 94. This tends to reduce the pressure in the port 94 and the pressure below the piston 56 so that the thermostatic piston 67 can again open the inlet port 90 and close the vent port 94. This arrangement, as is known, maintains a pressure in the port 92 which is measured by the temperature of the material 70, and because this pressure is exerted in the chamber 102, this arrangement increases the pressure of the main line by an amount measured by the temperature of the material 70. If the temperature increases the opening force on the piston 67 increases and this requires a greater pressure behind the piston 56 to close the port 90 and open the port 92, which results in maintaining a higher pressure in the boost chamber 102 and a higher pressure in the main line measured by the increased temperature of the material 70. Therefore, after the temperature of the material 70 has increased to an amount which will express the piston 67 sufficiently to open the port 90 and close the port 94, the member 56 acts as a regulator valve which maintains in the chamber 102 a pressure varying with the temperature of the material 70 above a predetermined minimum.

The operation of the regulator valve discussed above in connection with FIG. 2 depends upon a compressible material 70 which is sensitive to changes in temperature so that small changes in temperature exert small changes of force on the piston 67 in order that the piston 67 may be moved into the container 68 against the pressure of the material 70 by the regulated pressure beneath the piston 56. Such material may be a gas or a quantity of volatile liquid and a quantity of gas.

Thermally-expanding waxes are also suitable for the material 70 particularly where it is satisfactory to either admit full line pressure to chamber 102 or to vent the chamber completely, as in FIG. 1. Waxes may not respond rapidly to changes in temperature of the oil and may not exert finely graduated pressures on the piston 67. This makes the waxes suitable for a control system in which the pressure of the main line is either fully boosted or not boosted at all depending on whether the temperature is above or below a predetermined amount. Where it is desired to apply a pressure to the boost chamber which varies with temperature, a compressible thermoresponsive material such as gas or a mixture of gas and volatile liquid is preferred. If the control member 56 pressurizes the pressure boost chamber 102 at a sufficiently low car speed after the front pump has been vented, the piston 104 will move the valve stem 34 to restrict or close port 32 and increase the pressure delivered by the front pump, thus bringing the front pump back into operation to increase the flow capacity of the system.

I claim:

1. A transmission comprising in combination a hydrodynamic torque transmitter, a liquid cooler, two pumps for circulating liquid under pressure through the transmitter and cooler, means for operating both pumps at the same time, means for regulating the total pressure of liquid supplied by the pumps, means responsive to a predetermined total pressure of liquid delivered by the pumps for reducing the delivery pressure of liquid supplied by one pump, and means operating after the delivery pressure of said one pump has been reduced and in response to a predetermined temperature of liquid in the transmitter to increase the pressure of liquid delivered by said one pump.

2. A transmission comprising in combination a hydrodynamic torque transmitter, a liquid cooler, a relatively large capacity pump and a relatively small capacity pump for circulating liquid under pressure through the transmitter and cooler, means for operating both pumps at the same time, means for regulating the total pressure of liquid supplied by the pumps, means responsive to a predetermined total pressure of liquid delivered by the pumps for reducing the pressure of liquid supplied by the large capacity pump, and means operating after the delivery pressure of said large capacity pump has been reduced and in response to a predetermined temperature of liquid in the transmitter to increase the pressure of liquid delivered by said large capacity pump.

3. A transmission comprising in combination a hydrodynamic torque transmitter, a liquid cooler, two pumps for circulating liquid under pressure through the transmitter and cooler, means for operating both pumps at the same time, a relief valve for venting one of the pumps, means responsive to a predetermined total pressure of liquid delivered by the pumps for opening the relief valve and means operating after the relief valve is open and in response to a predetermined temperature of liquid in the transmitter to close the relief valve.

4. A transmission comprising in combination a hydrodynamic torque transmitter, a liquid cooler, a pump for circulating liquid under pressure through the transmitter and cooler, a first pressure regulator valve for regulating the delivery pressure of the pump, a fluid pressure chamber associated with the valve for being filled with fluid under pressure for increasing the pressure maintained by the regulator valve, a second valve for connecting the pump to said fluid pressure chamber, a spring urging the second valve closed to disconnect the pump from the chamber and means responsive to the temperature of the liquid in the transmitter for urging the second valve open to connect the pump to the chamber.

5. A transmission comprising in combination a hydrodynamic torque transmitter, a liquid cooler, a pump for circulating liquid under pressure through the transmitter and cooler, a pressure regulator valve for regulating the delivery pressure of the pump, a fluid pressure chamber associated with the valve for being filled with fluid under pressure for increasing the pressure maintained by the regulator valve, a second pressure regulator valve for connecting the pump to said fluid pressure chamber, a spring urging the second valve to move in a direction to decrease the pressure supplied by the pump to the chamber and means responsive to increase of temperature of the liquid in the transmitter for urging the second valve to move in a direction to increase the pressure supplied by the pump to the chamber.

6. A transmission comprising in combination a hydrodynamic torque transmitter, a liquid cooler, a pump for circulating liquid under pressure through the transmitter and subsequently through the cooler, a pressure regulator valve for regulating the delivery pressure of the pump, a fluid pressure chamber associated with the valve for being filled with fluid under pressure for increasing the pressure maintained by the regulator valve, a second pressure regulator valve for connecting the pump to said fluid pressure chamber, a spring urging the second valve to move in a direction to decrease the pressure supplied by the pump to the chamber, and means at times responsive to increase of pressure due to restricted flow through the cooler for urging the second regulator valve to increase the pressure supplied by the pump to the transmitter.

7. A transmission comprising in combination a hydrodynamic torque transmitter, a cooler, a pump for circulating liquid from a reservoir through the transmitter, subsequently through the cooler and back to the reservoir, a valve for directing circulated liquid through the cooler, means at times responsive to increase of pressure of liquid due to restricted flow through the cooler for operating the valve to increase the flow through the cooler, and means for varying the delivery pressure of the pump in response to varying temperature of liquid in the transmitter.

8. A transmission comprising in combination a hydrodynamic torque transmitter, a cooler, a pump for circulating liquid from a reservoir through the transmitter and cooler and back to the reservoir, a movable control member which in one position restricts flow of circulated liquid through the cooler and in a second position increases the flow of liquid through the cooler and in a third position increases the delivery pressure of the pump, means responsive to the pressure in the transmitter for moving the control member from the first position to the second, and means responsive to the temperature of the liquid in the transmitter for moving the control member from the second position to the third.

9. A transmission comprising in combination a hydrodynamic torque transmitter, a cooler, a pump which circulates liquid from a reservoir through the transmitter and cooler and back to the reservoir, movable control means having a first valve which in one position of the control means restricts flow of circulated liquid through the cooler and in a second position of the control means increases the flow of liquid through the cooler, the control means having a second valve which in a third position of the control means increases the delivery pressure of the pump, means responsive to the pressure in the transmitter for moving the control means from the first position to the second, and means responsive to the temperature of the liquid in the transmitter for moving the control means from the second position to the third.

10. A transmission comprising in combination a hydrodynamic torque transmitter, a cooler, a pump which circulates liquid from a reservoir through the transmitter and cooler and back to the reservoir, a first pressure regulator valve for regulating the delivery pressure of the pump including a pressure-responsive chamber for increasing the pressure of the pump, control means for controlling flow of liquid through the cooler, the control means having a first valve for selectively restricting or increasing flow through the cooler and a second pressure regulator valve for delivering fluid under pressure to the chamber of the first pressure regulator valve, means responsive to the pressure in the transmitter for moving the control means to operate the first valve to increase the flow through the cooler and means responsive to the temperature of liquid in the transmitter for operating the second regulator valve to deliver to the chamber of the first regulator valve fluid at a pressure which varies with the temperature of liquid in the transmitter.

11. A transmission comprising in combination a hydrodynamic torque transmitter, a liquid cooler, a pump for circulating liquid under pressure through the transmitter and cooler, a first pressure regulator valve connected to the delivery side of the pump for regulating the delivery pressure of the pump, a first fluid pressure chamber associated with said regulator valve for being filled with fluid under pressure for increasing pressure maintained by the regulator valve, a second pressure regulator valve connected between the first pressure chamber and the delivery side of the pump, and means responsive to the temperature of liquid in the transmitter for operating the second regulator valve to supply fluid from the pump at a pressure which varies with said temperature.

12. A transmission comprising in combination a hydrodynamic torque transmitter, a liquid cooler, two pumps for circulating liquid under pressure through the transmitter and cooler, means for operating both pumps at the same time, a relief valve connected to the delivery side of one of the pumps, means responsive to a predetermined total pressure of liquid delivered by the pumps for opening the relief valve and means operating after the relief valve is open and in response to a predetermined temperature of liquid in the transmitter to close the relief valve.

13. A transmission comprising in combination a hydrodynamic torque transmitter, a cooler, a pump for circulating liquid from a reservoir through the transmitter subsequently through the cooler and back to the reservoir, a valve between the transmitter and the cooler for directing circulated liquid through the cooler, means at times responsive to increase of pressure of liquid due to restricted flow through the cooler for causing the valve to increase the flow through the cooler, and means for varying the delivery pressure of the pump in response to varying temperature of liquid in the transmitter.

14. A transmission comprising in combination a hydrodynamic torque transmitter, a liquid cooler, a pump which circulates liquid from a reservoir through the transmitter and cooler and back to the reservoir, movable control means having a first valve between the transmitter and the cooler which in one position of the control means restricts flow of circulated liquid through the cooler and in a second position of the control means increases the flow of liquid through the cooler, the control means having a second valve which in a third position of the control means increases the delivery pressure of the pump, means responsive to the pressure in the transmitter for moving the control means from the first position to the second, and means responsive to the temperature of the liquid in the transmitter for moving the control means from the second position to the third.

15. A transmission comprising in combination a hydrodynamic torque transmitter, a cooler, a pump which circulates liquid from a reservoir through the transmitter, subsequently through the cooler and back to the reservoir, a first pressure regulator valve connected to the delivery side of the pump for regulating the delivery pressure of the pump including a pressure-responsive chamber for increasing the pressure of the pump, control means for controlling flow of liquid through the cooler, the control means having a first valve between the transmitter and the cooler for selectively restricting or increasing flow through the cooler and a second pressure regulator valve for delivering fluid under pressure from the pump to the chamber of the first pressure regulator valve, means at times responsive to increase of pressure due to restricted flow through the cooler for moving the control means to operate the first valve to increase the flow through the cooler and means responsive to the temperature of liquid in the transmitter for operating the second regulator valve to deliver to the chamber of the first regulator valve fluid at a pressure which varies with the temperature of liquid in the transmitter.

16. A transmission comprising in combination a hydrodynamic torque transmitter connected with a liquid cooler, a pump for maintaining static pressure in the transmitter and for circulating liquid through the transmitter and cooler, said pump having an inlet and an outlet, means for maintaining the outlet pressure of the pump at a substantially constant value, and means responsive to increase of temperature of the liquid in the transmitter for increasing the outlet pressure of the pump.

17. A transmission comprising in combination a hydrodynamic torque transmitter connected with a liquid cooler, a pump for maintaining static pressure in the transmitter and for circulating liquid through the transmitter and cooler, said pump having an inlet and an outlet, means for maintaining the outlet pressure of the pump at a substantially constant value, and means responsive to increase of temperature of liquid in the transmitter to a predetermined value for influencing the pressure maintaining means to increase the outlet pressure of the pump.

18. A transmission comprising in combination a hydrodynamic torque transmitter connected with a liquid cooler, the transmitter being driven by a prime mover and driving a load, a pump for maintaining static pressure in the transmitter and for circulating liquid through the transmitter and cooler, said pump having an inlet and an outlet, pressure-regulating means for maintaining a range of pump outlet pressure varying with the power demand on the prime mover, and means responsive to an increase of temperature of the liquid in the transmitter for increasing the values of outlet pressure of the pump in the range maintained by the regulating means.

19. A transmission comprising in combination a hydrodynamic torque transmitter connected with a liquid cooler, a pump for maintaining static pressure in the transmission and for circulating liquid through the transmission and cooler, said pump having an inlet and an outlet, a pressure regulator valve for regulating the outlet pressure of the pump, a fluid pressure chamber associated with the valve for being filled with fluid under pressure for increasing the pressure maintained by the regulator valve in accordance with the pressure in the chamber, and means responsive to an increase of temperature of liquid in the transmitter to a predetermined value for filling the chamber with fluid at a predetermined pressure.

20. A transmission comprising in combination a hydrodynamic torque transmitter connected with a liquid cooler, a pump for maintaining static pressure in the transmitter and for circulating liquid through the transmitter and cooler, said pump having an inlet and an outlet, a pressure regulator valve for regulating the outlet pressure of the pump, a fluid pressure chamber associated with the regulator valve for being filled with fluid under pressure for increasing the pressure maintained by the regulator valve in accordance with the pressure of the fluid in the chamber, and means responsive to the temperature of liquid in the transmitter for maintaining in the chamber a pressure measured by the temperature of the liquid in the transmitter.

21. A transmission comprising in combination a hydrodynamic torque transmitter, a liquid cooler, a pump for maintaining static pressure in the transmitter and for circulating liquid through the transmitter and cooler, said pump having an inlet and outlet, a first pressure regulator valve for regulating the outlet pressure of the pump, a fluid pressure chamber associated with the regulator valve for being filled with fluid under pressure for increasing the pressure maintained by the regulator valve in accordance with the pressure in the chamber, a second pressure regulator valve connected to the pressure chamber, and means responsive to the temperature of liquid in the transmitter for operating the second regulator valve to maintain pressure in said chamber measured by said temperature.

22. A transmission comprising in combination a hydrodynamic torque transmitter, a liquid cooler, a pump for maintaining static pressure in the transmitter and for circulating liquid through the transmitter and cooler, said pump having an inlet and an outlet, a pressure regulator valve for maintaining the outlet pressure of the pump at a substantially constant value, a fluid pressure chamber associated with the valve for being filled with fluid under pressure for increasing the pressure maintained by the regulator valve in accordance with the pressure in the chamber, and means responsive to increase of temperature of liquid in the transmitter to a predetermined value for filling the chamber with fluid and maintaining therein a pressure measured by said temperature.

References Cited in the file of this patent
UNITED STATES PATENTS

| | | |
|---|---|---|
| 2,459,734 | McCracken | Jan. 18, 1949 |
| 2,631,432 | Newcomb | Mar. 17, 1953 |
| 2,691,940 | McFarland | Oct. 19, 1954 |
| 2,714,804 | O'Leary | Aug. 9, 1955 |
| 2,766,589 | O'Leary | Oct. 16, 1956 |
| 2,777,638 | Wood | Jan. 15, 1957 |
| 2,837,285 | Urban | June 3, 1958 |